Figure 1:
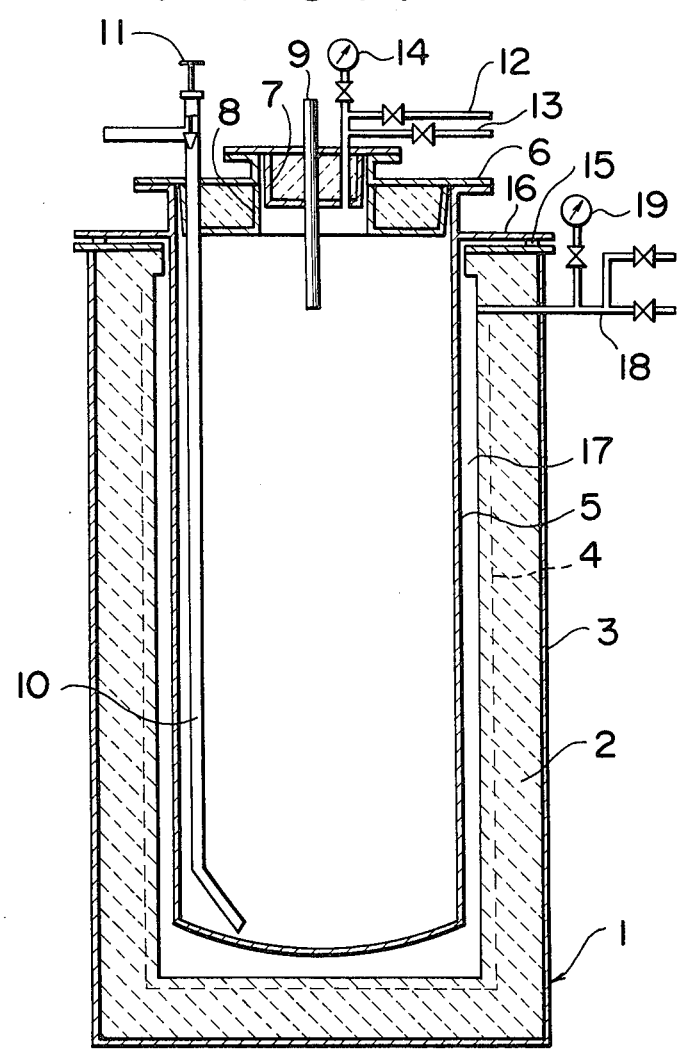

United States Patent [19]

Ishizuka

[11] 4,441,925
[45] Apr. 10, 1984

[54] METHOD AND AN APPARATUS FOR PRODUCING TITANIUM METAL FROM TITANIUM TETRACHLORIDE

[76] Inventor: Hiroshi Ishizuka, 19-2, Ebara 6-chome, Shinagawa-ku, Tokyo, Japan

[21] Appl. No.: 360,054

[22] Filed: Mar. 19, 1982

[30] Foreign Application Priority Data

| Apr. 4, 1981 | [JP] | Japan | 56-50896 |
| May 18, 1981 | [JP] | Japan | 56-74606 |
| May 22, 1981 | [JP] | Japan | 56-77461 |

[51] Int. Cl.$^3$ ............................................. C22B 34/12
[52] U.S. Cl. ........................................ 75/84.5; 266/168
[58] Field of Search ................ 75/84.5, 84.4; 266/199, 266/190, 166, 167, 197, 198, 168; 373/110, 111, 109

[56] References Cited

U.S. PATENT DOCUMENTS

| 2,607,674 | 8/1952 | Winter, Jr. | 75/84.5 |
| 2,782,118 | 2/1957 | Hood | 75/84.5 |
| 2,787,539 | 4/1957 | Lonklin | 75/84.5 |
| 2,816,828 | 12/1957 | Benedict | 75/84.5 |
| 2,847,297 | 8/1958 | Pietro | 75/84.5 |
| 2,865,738 | 12/1958 | Muller | 75/84.5 |
| 2,882,143 | 4/1959 | Schmidt | 75/84.5 |
| 2,942,969 | 6/1960 | Doyle | 75/84.5 |
| 3,692,294 | 9/1972 | Ishimatsu | 75/84.5 |
| 3,715,205 | 2/1973 | Ishizuka | 75/84.5 |
| 3,966,460 | 6/1976 | Spink | 75/84.5 |
| 4,105,192 | 8/1978 | Ishimatsu | 75/84.5 |
| 4,152,111 | 5/1979 | Larken | 373/110 |
| 4,242,136 | 12/1980 | Ishizuka | 75/84.5 |
| 4,285,724 | 8/1981 | Becker | 75/84.5 |

FOREIGN PATENT DOCUMENTS 1084923 7/1960 Fed. Rep. of Germany ....... 75/84.5

*Primary Examiner*—L. Dewayne Rutledge
*Assistant Examiner*—John J. Zimmerman
*Attorney, Agent, or Firm*—Larson and Taylor

[57] ABSTRACT

In a method for producing titanium metal from tetrachloride which comprises holding magnesium as fused in a space which is provided within an elongated vessel means and is heatable with a furnace means to surround, introducing titanium tetrachloride onto said magnesium to cause a reaction therebetween to form titanium metal product and magnesium chloride byproduct, continuing such reaction until the vessel means is deposited with a substantial volume of titanium metal and recovering the metallic product and chloride byproduct, an improvement which comprises a pressure-regulatable air tight interspace between the vessel means and the furnace means, and keeping said interspace at a pressure, with an inert gas, close to that inside the vessel means while the vessel is heated in the furnace.

6 Claims, 6 Drawing Figures

METHOD AND AN APPARATUS FOR PRODUCING TITANIUM METAL FROM TITANIUM TETRACHLORIDE

The present invention relates to improvements in a method and an apparatus for producing titanium metal by the Kroll Process, in which titanium tetrachloride is reduced with fused magnesium.

Titanium metal is industrially produced generally by reduction of titanium tetrachloride with fused magnesium: $TiCl_4+2Mg\rightarrow Ti+2MgCl_2$ in a process wherein the titanium tetrachloride is fed to the magnesium held in a crucible heatable with an openly surrounding furnace. During such a process the inside of the crucible is subjected to a temperature of above 800° C. as well as a positive pressure so as to block penetration of ambient air. The positive pressure is further raised to 1 $Kg/cm^2$ (by gauge) in many cases where magnesium chloride byproduct is tapped off as liquid during or at the end of reduction run. Thus the vessel used for this purpose must exhibit a mechanical strength strong enough to support the weight of both the contents and the vessel itself under the combined conditions of the elevated temperatures and difffferential pressure employment. Although some heat resistant steel is available, quite a thick wall must be necessarily provided to impart proper physical strength, and in addition the material is rather expensive. For example, when a vessel is made of a 13-Cr type stainless steel to measure 1.5 m in diameter and 4.5 m in length for a capacity of three tons of titanium product, the vessel weighs as much as six tons with a wall thickness of 33 mm.

On the other hand, it is desired that such vessel be constructed to an enlarged capacity for improved production efficiency per batch; this is quite a difficult problem with the conventional operation intended, since such an enlarged vessel involves a further increased wall thickness, and as a result of this increased weight, plant equipment such as hoists used to transfer the vessel must accordingly be provided with an increase capacity as well. In addition, in communications between the reaction in the vessel and regulation outside, or between temperature detection by means of thermometers placed on the outerface of the vessel and temperature control by cold air circulation on the vessel, a thickened wall of rather heat inconductive material such as Cr-stainless steel unfavorably causes delay in both ways. Further even such a thickened wall cannot be effective for sufficiently extended service. Nickel alloyed steel is preferred because of its improved heat resistance but is not applicable without a troublesome handling such as the provision of a special lining thereon, for otherwise the ingredient nickel is consumed as alloyed with magnesium during the process. The material also is vulnerable to cracking due to inherent intergranular corrosion and thus involves a dangerous possibility to flow liquid contents out of the vessel.

For practice of the process, an apparatus design described, for example, in German Patent Specification No. 1084923 is widely employed and basically comprises a cylindrical member with a closed bottom so as to hold liquid phase and another cylindrical member arranged therein and closed at a bottom with a detachable grid plate, the latter having a number of through holes therein so as to selectively support solid phase thereon. Titanium tetrachloride is supplied as either liquid or vapor to a bath of fused magnesium held in the vessels filled initially to a level slightly over the grid plate, thus initiating the reaction. Heavier than the liquid magnesium, titanium metal as well as magnesium chloride thus formed come down in the former, and the metal to a substantial part rests on the grid plate, while the chloride rests on a bottom of the outer vessel. As the reaction proceeds, the content of the vessels increases in mass so the magnesium has a surface level rising accordingly. In cases where the level rises too high, at which the reaction substantially takes place, magnesium chloride may be tapped off in some instances during such process at intervals so that the magnesium level is lowered, thus providing a practical space above the magnesium surface, when the reaction is resumed. Such a cycle is continued until there is no more magnesium effectively available in the vessels. The introduction of titanium tetrachloride is also discontinued when the content in the vessels has a surface level at or over a predetermined upper limit. The metallic reducing agent is in some cases replenished after the chloride byproduct is removed when the metal has been consumed, especially in cases where the vessels are of a design to provide a small space within. Anyway by such conventional techniques whereby the reaction is caused at a varying magnesium level up starting from a position only a little above the bottom plate, the resulting titanium tends to deposit as a hollow bulk full of closed large cavities within, thus blocking some part of molten magnesium from coming out to the surface for reaction. Achieved magnesium efficiency is therefore inevitably low.

On the other hand, or more important than the above, such a reaction is controlled usually on temperature measurement of a reaction zone (one in a vicinity of the magnesium surface as fused) by means of thermometers placed at different height levels on an outer face of the outer vessel. Since an excessively elevated temperature of a region adjacent to the vessel wall causes contamination of the metallic product deposited thereon by alloying with wall material to result in a poor product purity achieved, and since the reaction is of an exothermic nature, the region is essentially controlled so that a temperature may be maintained in this circumferential region securely below an alloying point between the two materials, by moderately feeding titanium tetrachloride or by cooling the zone from outside the vessels. In the former case, the attainable operation rate inevitably remains low, while in the latter case, however, a proper regulation for the reaction is fairly a tough task because of a varying magnesium surface level where the reaction takes place, which cannot be precisely detectable and follow up exactly with such insensitive technique as generally employed temperature measurement through rather thick vessel walls.

Another technique, published in U.S. Pat. No. 3,158,671 to Socci, is known for titanium production from the tetrachloride, whereby the tetrachloride and magnesium are alternately introduced in an inner cylindrical vessel which is enveloped in another cylindrical vessel and has a wall full of tiny through holes of a specific dimension. Allowing to selective removal of magnesium chloride byproduct from magnesium reducing agent through such specific holes as well as alternating small batch feed of reactants, the process permits an improved magnesium efficiency as well as a regular reaction rate to be achieved. However, it is observed, disadvantageously, that the technique requires rather sophisticated and costly means as injection of fused magnesium as well as special holes in the vessel wall which seemingly tend to change in size or, clog partially or at worst entirely with finely divided titanium solid formed by the reaction.

Still another apparatus construction is known from U.S. Pat. No. 3,684,264 to Ivanovich Petrov et al. The chloride reduction section comprised in such apparatus, in contrast, is of a single cylinder construction, though. Titanium tetrachloride is reduced and titanium metal is deposited in the sole vessel. This means requirement of a troublesome treatment for discharging the contents, in comparison with the first mentioned vessel construction where a second cylindrical vessel is employed to receive the product, and thus the content is readily removable out of the apparatus by separating the vessels and by pushing the contents with a suitable mechanical means.

Therefore, an objective of the present invention is to provide improved methods for production of titanium metal by chloride reduction with magnesium, which are substantially free of above said drawbacks.

Another objective of the invention is to provide an improved apparatus to effectively put such methods in practice.

According to the invention there is provided, first, in a method for producing titanium metal from titanium tetrachloride which comprises holding fused magnesium in a space which is provided within an elongated vessel means and surrounded by and heatable with a furnace means, introducing titanium tetrachloride onto said magnesium to cause a reaction therebetween to form titanium metal product and magnesium byproduct, continuing such reaction until there is deposited in the vessel means a substantial volume of titanium metal, and recovering the metallic product and chloride byproduct, the improvement which a pressure-regulatable air tight interspace between the vessel means and the furnace means, and keeping said interspace at a pressure, with an inert gas, close to that inside of the vessel means, while the vessel is heated in the furnace. Also provided is, another improvement which essentially comprises starting introduction of said tetrachloride to the magnesium while the surface level of fused magnesium is a substantial vertical distance from a means for receiving a substantial part of down-coming titanium metal product, and discharging the byproduct as fused so that said magnesium surface level may be maintained within a limited range, thus providing, from the outset to the end of the reaction run, a substantial vertical distance between the level where titanium metal is formed and the means where the metallic product is accumulated, while the temperature condition is especially regulated over said range. Although such methods may be conducted with conventional arrangements of various types directed to a similar production of titanium metal, they are preferably performed with an apparatus, according to the invention, for producing titanium metal by reduction of titanium tetrachloride with fused magnesium which apparatus comprises: a cylindrical outer vessel which has a top closed with a detachable lid, a furnace means which is so arranged as to enclose a substantial part of the vessel up from a bottom thereof and to have an interspace with the vessel sealable in a substantial air-tightness, a cylindrical inner vessel which has atop a tube means for introducing titanium tetrachloride and at a bottom thereof a detachable plate riddled with through holes so as to receive a downcoming solid product of titanium metal but to allow to pass through a liquid byproduct of magnesium chloride as well as magnesium metal as fused, and a duct means which extends into the outer vessel for discharging the byproduct, said outer vessel being provided thereon with a cooling jacket at an upper portion of the inner vessel which is dividably joined to the lid.

In the invention, particularly relating to the first mentioned method, an airtightly sealed closed space (referred to as interspace in this specification) is provided between the vessel and furnace means, usually sealed at a flange portion with a heat resistant packing. An inert gas such as argon fills the interspace. As the furnace means is actuated and as the reaction proceeds inside the vessel means, the pressure varies inside and outside the vessel means, so regulation becomes necessary to maintain a differential pressure within a given range, preferably, of 0.2 Kg/cm$^2$. The closer to zero, the better. Thus substantially unloaded of stresses due to the differential pressures which are significant at such elevated temperatures where the reaction takes place, the vessel may consist of carbon steel of some grades, which has been heretofore considered ineffective to this application due to inherent insufficient meachanical strength at elevated temperature, in the place of conventionally employed rather expensive stainless steels. Or alternatively, a possibility is provided by the invention to readily construct a vessel for the process of a substantially increased capacity.

With regards to the second method as well as the apparatus, magnesium dichloride is discharged as fused from the vessel means, continuously or intermittently at a regular or irregular interval, through a duct means which extends into the vessel at a bottom portion thereof. Thus a magnesium surface level is maintained at a substantial vertical distance from the bottom grid plate, said distance varying depending on vessel capacity. The vessel means is cooled from outside in some ways. A cylindrical jacket, which is attached to the outside face of the outer vessel and through which cold air is circulated, is inexpensive to construct and easily accesible while working effectively.

The vessel means of the present invention advantageously take a double-cylindrical construction, though it is obvious that the method as mentioned first is as well applicable to such a single cylindrical design as disclosed in U.S. Pat. No. 3,684,264 to Ivanovich Petrov et al.

As taken out of the furnace, the inner cylindrical vessel is detached from the lid for discharging reaction products and for charging fresh magnesium metal. Connection between the lid and the vessel can be realized in various ways. In an example, the vessel is in a hanging arrangement from the lid through a rather thin tubular body (bottle neck) which is cut to disassemble and welded to unite; or an inner vessel of generally straight cylindrical construction is fixed to the lid by means of several bolts running through the lid into a rather thick walled top edge of the vessel, said bolts being preferably forcibly cooled at the head. An additional mechanical coupling may be provided for a facilitated positioning and secured tightness. For this purpose the mating faces of the lid and vessel may have a circular tenon and a groove to fifly accomodate it, each on either side. In another case the lid has a rather short cylindrical skirt with which the vessel is put in a close telescopic connection, with either placed on outside. Further, such bolting and the secondary coupling means can be replaced by a so-called bayonet connection, by which several pins or claws attached to the lid are put in respective L-shaped small slots and then revolved relatively to the vessel slightly to a stop, thus providing a secured fixation.

Figure 2:
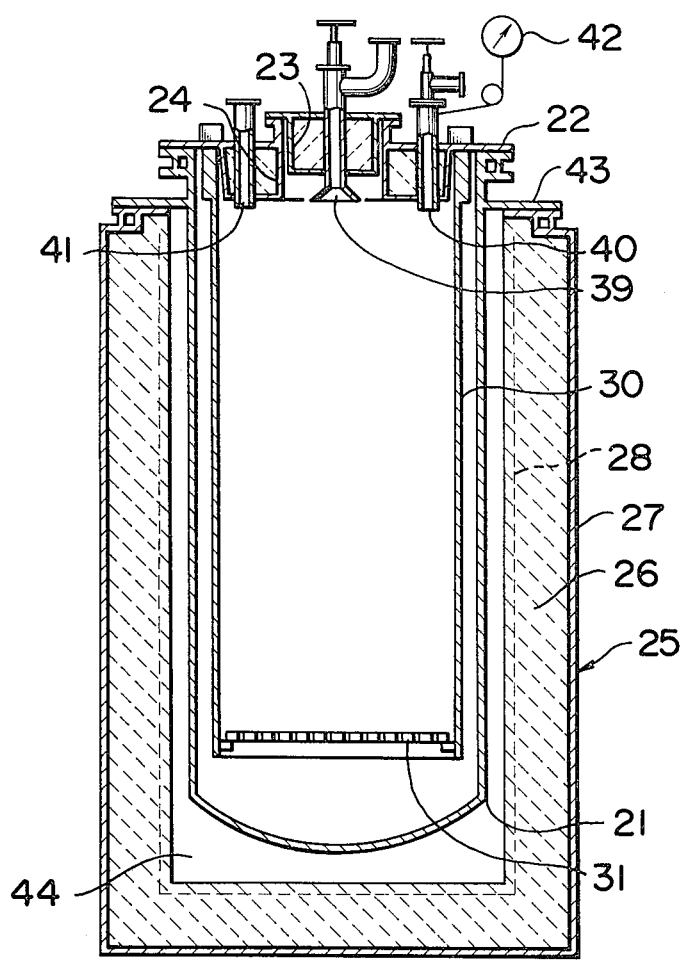
Figure 3A:
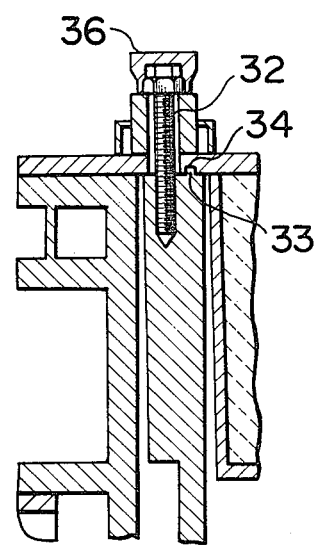
Figure 3B:
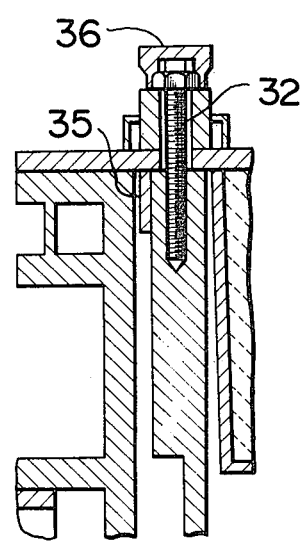
Figure 3C:
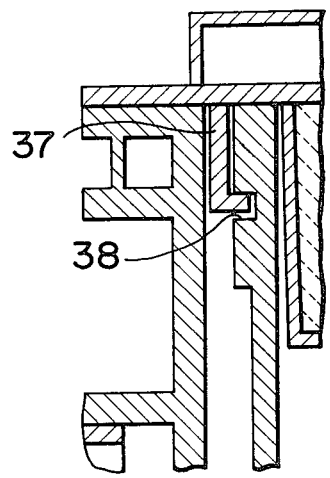
Figure 4:
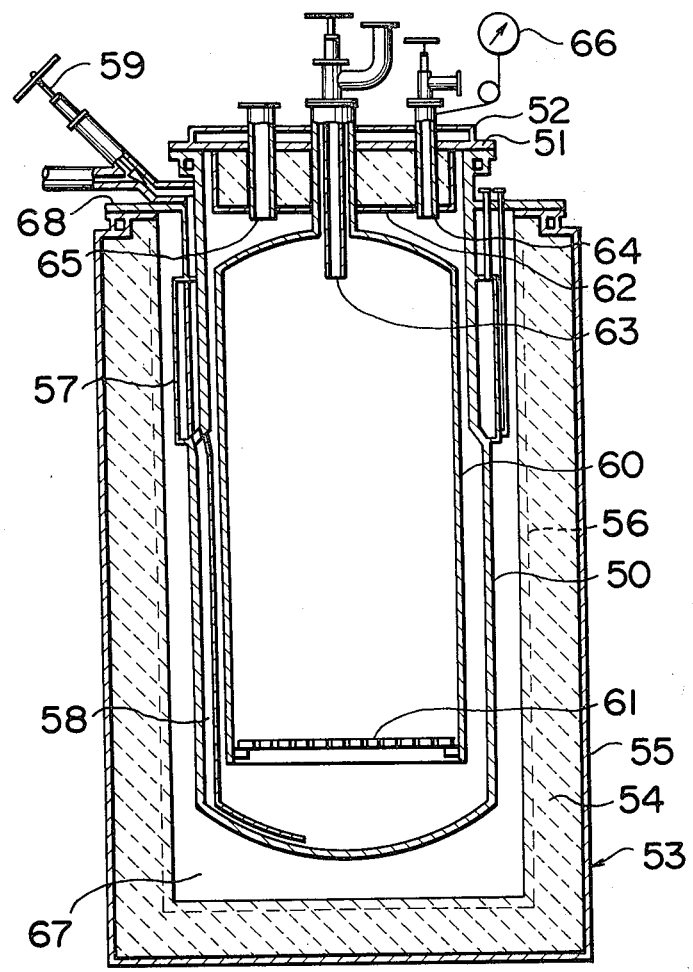

Other features of the invention and effects attained thereby will be better understood from the following description taken in connection with the accompanying drawing which is given for illustrative purpose only, and not for limiting the invention. Of which drawing, FIG. 1 is an elevational view, in section, of an apparatus applicable to practice of the first method of the invention;

FIG. 2 illustrates such sectional view of an apparatus as constructed according to the invention and especially suitable to practice of the first method of the invention;

FIG. 3 schematically shows at (a) to (c) a detailed view of a few variations for connection between the inner vessel and the top lid; and FIG. 4 illustrates an elevational view, in section, of another apparatus as constructed according to the invention and suitably applicable to both of the first and second methods of the invention.

In the Figures, particularly with regards to FIG. 1, an airtightly closable electrical furnace, generally designated at 1, comprises a substantially cylindrical wall 2, made of refractory material and coated with an iron shell 3, and a heating element 4 provided on the inner face and made of, for example, Ni-Cr alloy. The furnace 1 is so arranged as to enclose a cylindrical vessel or crucible 5 for heating the latter. The vessel, according to the invention, may consist of carbon steel of an SS grade (by JIS designation), for example. The vessel 5 has a top lid 6 with cans 7, 8 attached thereon and packed with such an insulative material as pearlite, as well as tubes 9 and 10, with a valve 11, which extend into the vessel 5 through such lid assembly for, respectively, feeding titanium tetrachloride and discharging magnesium chloride with a lower end thereof in an upper region and close to a bottom end of the vessel. The lid also has tubes 12, 13 extending therethrough for supplying inert gas and for bleeding and evacuating the vessel 5, respectively, as well as a pressure indicator 14. A packing ring 15 of heat resistant rubber, for example, is provided as inserted between the flange 16 of the vessel and the furnace 1 to ensure an airtight sealing for an interspace 17 formed between the vessel 5 and the furnace 1, to which space a tube 18 with a pressure indicator 19 is connected for pressure regulation therethrough.

Such a vessel may have an additional cylindrical member inside, as shown in FIG. 2 which gives another arrangement for and of the invention. Basically similar to the one shown in FIG. 1, the apparatus comprises a cylindrical vessel 21 with a closed bottom, a top lid 22 of steel with cans 23, 24 packed with heat insulative material, and an electrical furnace 25 composed of a refractory wall 26, an iron shell 27 and a heating element 28. Inside the vessel 21, an additional substantially cylindrical vessel 30 is provided, at an open bottom of which is supported a grid plate 31 perforated with a number of holes.

For a facilitated separating and uniting of the inner vessel and the lid as well as a secured close connection, the inner vessel 30 in this example is joined with the lid 22 by means of several threaded bolts 32 run into a top portion having a rather thickened wall of the vessel as better seen in FIG. 3 at (a) and (b), simultaneously with an auxiliary mechanical coupling, such as a circular tenon 33 to be mated with a circular groove 34 to fitly accomodate the former. In the place of such tenon-groove coupling, a telescopic connection may also be employed which consists of a rather short cylindrical skirt or ring 35 attached to the lid as hanging therefrom and having such dimensions as to be fitly and closely connected with the vessel. The bolts preferably have a top end covered with respective cap nuts 36 which are advantageously water cooled.

As a substitute for the bolts and coupling joint, a so-called bayonet connection is also effective (given schematically in FIG. 3, at (c), particularly), by which several hooked claws 37 attached to the lid, in a circular arrangement, are put into L-shaped slots 38 so formed as to mate with each claw at a top end of the vessel 30, and then the members 25, 30 are pushed close until they are in a close contact and slightly revolved relative to each other to a stop, thus providing a secured connection between the lid and the vessel. It is obvious here that a small modification may be effectively made, within the scope of the invention, to the above listed joints between the inner vessel and the lid.

Through the lid member 22 as featured above, tubes 39, 40, 41 with a pressure indicator 42, extend into the inner vessel 30, respectively, for feeding titanium tetrachloride, supplying inert gas and degassing the vessels. Although not shown in particular, a heat resistant packing ring is inserted between a flange portion 43 of the vessel 21 and the furnace 25 to provide a substantially closed interspace 44, of which the pressure is regulatable, as in the case of FIG. 1.

The apparatus arrangement shown in FIG. 4 is an example which is applicable to both of the first and second methods of the invention. Here in this case, similarly to the above examples, a substantially cylindrical outer vessel 50 has a detachable lid 51, which is airtightly sealable and has thereon a cooling jacket 52, and is placed inside an electrical furnace 53 comprising a refractory wall 54 coated with an iron shell 55 thereon outside and on an inside face thereof a heating element 56 which is divisively regulatable in several sections. The outer vessel 50, especially in this example, comprises on a cylindrical wall thereof at an upper region a cylindrical jacket 57, for cooling by a circulation of cold air therethrough, as well as a duct 58, with a valve 59 thereon, extending into the vessel at a bottom end for discharging magnesium chloride byproduct as fused. Inside the vessel 50 there is arranged a substantially cylindrical inner vessel 60 which has an open bottom covered with a grid plate 61 detachably attached thereto for receiving a downcoming solid product of titanium metal while allowing to pass such liquids as magnesium metal and magnesium chloride. The cooling jacket 57 and the grid plate 61 are arranged at a substantial vertical space therebetween.

The lid 51 has a can 62, packed with a suitable heat insulative substance and, preferably, provided therein with a heating element (not shown) for preventing solidification of magnesium metal on a can surface which results in a purity trouble on the metallic product. A tube 63 and tubes 64 and 65 with a pressure indicator 66, each arranged to extend through the lid 51 and into and outside the inner vessel 60, are used to feed titanium tetrachloride as well as to supply inert gas and to degas for bleeding or evacuating the vessels 50, 60. Although not illustrated in particular, a closed interspace 67 is formed between the outer vessel 50 and the furnace 53, airtightly sealed with a heat resistant packing ring provided between a flange portion 68 and the furnace 53, the space being pressure regulatable similarly to the case shown in FIG. 1.

When required, a duct means (not shown) also may be provided for supplying magnesium metal in fused state to the inner vessel 60 for an extended operation period.

EXAMPLE 1

An arrangement as substantially illustrated in FIG. 1 was employed, which basically comprised a cylindrical vessel, as crucible which was made of an SS grade (by JIS designation) carbon steel and had dimensions of 1.8 m in I.D., 4.5 m in general length and 30 mm in wall thickness, as well as a cylindrical furnace which was 2.5 m in O.D. and had a 10 mm thick shell of iron thereon outside. The vessel was loaded with 7.5 tons of magnesium and was provided inside with an atmosphere of argon gas at a slightly positive pressure of 0.2 $Kg/cm^2$ (by gauge pressure, the values should be understood as such hereinafter without definit indication), and then set in the furnace. Secured with bolts and sealed with packing ring of heat resistant rubber inserted between the vessel at a flange and the furnace, an interspace between the two members was secured of a substantially airtight sealing, was degassed to a vacuum and then filled with argon at 0.2 $Kg/cm^2$. The furnace was power supplied to heat the vessel to about 800° C. and melt the magnesium contained therein. During such heating pressure in the interspace was so regulated as to be identical to or higher up to 0.1~0.2 $Kg/cm^2$ over the level inside the vessel by occasionally bleeding from the latter. After a vessel temperature of 800° C. was reached titanium tetrachloride was introduced into the vessel at a rate of 500 Kg/h. As pressure gradually rose in the vessel with the reaction between the metal and chloride proceeding exothermally, argon gas was added to the interspace and maintained at a pressure level identical to or slightly higher than that inside the vessel. In the course of such reaction magnesium chloride byproduct was discharged from the vessel every four hours, when the interspace pressure was regulated to match that inside the vessel. As a result of 40 hours introduction of titanium tetrachloride, approximately five tons of titanium metal was recovered as sponge.

Not showing any substantial deformation even after 50 time repeated such runs, which are an average practical service life of conventional designs, the inner vessel was still in a good health to allow further use.

EXAMPLE 2

The operation substantially set forth above in Example 1 was repeated, except that a pressure was maintained 0.1~0.15 $Kg/cm^2$ higher in the interspace than in the vessel. As a result a substantially same performance was achieved, with the inner vessel in good health after 100 time repeated such runs.

EXAMPLE 3

The apparatus dimensioned in Example 1 was used. The vessel was loaded with 7.5 tons of magnesium, provided with an atmosphere of argon at 0.2 $Kg/cm^2$ and placed in the furnace. The interspace between the vessel and the furnace was degassed to a vacuum and then filled with argon to a pressure of 0.6 $Kg/cm^2$. Supplied with power the furnace was operated to heat the inner vessel to approximately 800° C. to melt the magnesium within. When pressure rose both in the vessel and in the interspace, regulation was made by occasionally bleeding so that the pressure of the interspace was within 0.2 $Kg/cm^2$ from that in the vessel, either positively or negatively but anyway not exceeding 0.5 $Kg/cm^2$ by gauge. After a temperature of 800° C. was reached, titanium tetrachloride was introduced as liquid into the vessel through the tube atop at a rate of 500 Kg/h. As pressure rose gradually inside the vessel as the reaction went on, an additional argon was supplied to the interspace so the pressure there was substantially identical to that inside the vessel. Magnesium chloride byproduct was discharged every four hours in the course of the run, when the interspace pressure was adjusted to be within the given range from the vessel pressure. In the end, with titanium tetrachloride introduction continued for 40 hours in total, approximately five tons of titanium sponge was obtained. The outer vessel thus used was in good condition to allow further service after 50 time repeated such runs.

EXAMPLE 4

Titanium tetrachloride was converted to the metal in a similar way to the one described in Example 3, but that pressure condition in this case, after loading of magnesium ingots, was such that the values on gauge were commonly 0.2 $Kg/cm^2$ inside the vessel and in the interspace, before the furnace was actuated; varied between 0 and 0.4 $Kg/cm^2$ inside the vessel and within 0.2 $Kg/cm^2$ relative to such concurrent vessel pressure, with an absolute maximum of 0.6 $Kg/cm^2$ inside the interspace, before introduction of the tetrachloride; and varied between 0.2 and 1.0 $Kg/cm^2$ inside the vessel, while maintained at 0.6 $Kg/cm^2$ in the interspace after the reaction began. In 40 time repeated such runs, the vessel looked in good physical condition without any substantial deformation in geometry, allowing an extended service.

EXAMPLE 5

An apparatus design substantially shown in FIG. 2 as well as FIG. 3 at (a) was used. A cylinder with a closed bottom made of SUS 316 grade stainless steel (by JIS designation) was employed as outer vessel which measured 4.5 m in general length, 1.65 m in I.D. and 32 mm in wall thickness; in this substantially coaxial arrangement a cylindrical member, open throughout, of SUS 410 stainless steel was used as inner vessel, which was 3.5 m in general length, 1.5 m in I.D. and 19 mm (and 55 mm especially at a top end) in wall thickness. A grid plate of stainless steel was attached to the inner cylindrical member at a bottom thereof, and loaded thereon with 8.5 tons of magnesium as ingots. Then the inner vessel thus assembled was closed with a plate of SS grade carbon steel as top lid and tightly secured by means of 16 bolts 32 mm across of SUS 304 grade stainless steel, which were circularly arranged and had each top covered with a respective cap nut to seal bolt holes. The inner vessel was now set in the outer vessel which had been arranged within an electrical furnace with the interspace pressure regulatable. The furnace was power supplied to heat the outer vessel and the magnesium therein in an inert atmosphere of argon, then titanium tetrachloride was fed to the bath to initiate a reaction, which was continued so that six tons of titanium sponge was recovered, by circulating cooling water through jackets around the bolts and by occainally operating a heater in the cans of insulative attached to the lid so as to prevent magnesium deposition thereon. It took only an hour or so in all for separation and connection of the inner vessel with the lid member, which could be readily done. The vessels showed no substantial geometric deformation caused on the vessels even after 100 time repeated runs. That consists a substantial improvement over conventional operation which usually takes a total time of five hours for cutting and welding of the inner vessel and which allows a repeated use of the vessel of as few as some 50 runs on an average.

EXAMPLE 6

An apparatus substantially illustrated in FIG. 4 was used, which comprised a SUS 410 grade (by JIS designation) inner vessel which measured 1.6 m in I.D. and 19 mm in wall thickness, and a SUS 316 grade stainless steel outer vessel which measured 4.5 m in general length, 1.7 m in I.D. and 32 mm in wall thickness and had a cylindrical jacket over a range of about 2 to 3 m from the bottom end of the inner vessel. A furnace was cylindrical and measured 2.5 m in O.D. and 5 m in length with an iron shell tightly covering thereover. Heating element was divisively regulatable at an upper section adjacent to the cooling jacket. The inner vessel as disassembled was charged with about 7.8 tons of magnesium as ingots, which is calculated to give a bath surface level of approximately 2.3 meters from the bottom of the inner vessel. With the vessels assembled as set in the furnace, and with the interspace, between the outer vessel and the furnace, filled with argon gas, the vessels were heated to approximately 800° C. to melt the magnesium contained therein, onto which titanium tetrachloride was introduced at a rate of 400 Kg/h through a tube atop the vessels. On estimated magnesium level from a total amount of supplied chloride and from differential pressure between inside and outside the outer vessel, liquid was tapped off from the vessels through a duct intermittently every three hours starting from six hours after the chloride introduction began. Power supply was discontinued to the furnace intermittently at an upper section adjacent to the jacket, where cold air was circulated through, so that the upper region was maintained at a temperature of not in excess of 950° C., thus minimizing contamination of metallic product by vessel material, while the rest of the vessel space was maintained at about 800° C., as measured on the outer face of the outer vessel, for an easy removal of the liquid byproduct. Differential pressure was so regulated that the level in the interspace was noway in excess of 0.6 Kg/cm$^2$ and within 0.2 Kg/cm$^2$, either positively or negatively, from the level in the vessels, as in antecedent examples. As a result of the above cycle, which was continued for 50 hours in total, the inner vessel was taken out to deliver some 5.1 tons of titanium sponge. This consists of a substantial improvement over conventional operations, which on an average produces titanium metal at a rate of approximately four tons/70 hour-cycle with the inside-vessel space occupied of only 70% at best.

As may be understood from the above description, the invention,

I. whereby the vessel to be used as adjacent to the furnace is substantially removed of stresses due to differential pressure between the inside and the outside of the vessel during operation, permits:

1. a substantial improvement to be achieved in plant economy as a result of now available carbon steel of some grade even at a decreased wall thickness, so the apparatus can be constructed less expensively and, accordingly, equipment of smaller capacity is required for handling or alternatively, with a substantially decreased wall thickness available, vessel construction of enlarged dimensions can be readily realized for an improved production efficiency per batch;

2. production of an improved quality at a substantially reduced cost as a result of increased mass of titanium tetrachloride treatable per batch, and as a result of the reaction to form titanium metal now controllable at a raised precision due to an improved communication between the reaction and regulation;

3. a considerably extended service life of the vessel member as a combined result of (a) exposure outside to an inert gas atmosphere so as to effectively eliminate deterioration by oxidation, (b) an essentially removed stress cracking which inevitably occurs in the case of alloyed steel heretofore employed, (c) avoided consumption of vessel material by magnesium or other reaction materials as in the case of Ni-alloyed steel, the nickel forming an alloy with magnesium to be dissolved in the bath, and (d) an effectively prevented geometrical deformation of the vessel by maintaining the differential pressure at a level within the specific range herein given; and 4. a secured safety provided for operators in case of accidental cracking of the vessel, because the possiblity has been substantially reduced for the liquid contents to flow outside the furnace since the latter has a tight wall construction with an iron shell thereon; and II. whereby a chemical reaction is caused between titanium tetrachloride and magnesium at a substantially limited range of the bath level, vertically distant from the level where titanium metal is received, permits:

1. a significant improvement to be achieved in product yield or quality as well as production rate at the same time, as a result of effectively regulatable temperature condition of the reaction zone, so that titanium tetrachloride can be supplied at a raised rate without increasing possibility of contamination by overheated vessel material of nearby deposited metal, 2. production of titanium metal of a regularly favorable chemical and mechanical quality at an improved yield, as a result of the reaction conductable with titanium tetrachloride supplied at a regular rate throughout the cycle, and 3. titanium metal deposit to be obtained in a favorable accumulation which is free of large cavities within, which are often observed when treated by a conventional technique whereby magnesium surface rises from an initial level close to a bottom plate to rest the metal, and which causes abnormally accelerated rise of such bath level to terminate the reaction with much magnesium metal unconsumed.

What is claimed is:

1. In a method for producing titanium metal from titanium tetrachloride, comprising holding fused magnesium in a space which is provided in an elongated vessel means and surrounded by and heatable with a furnace means, introducing titanium tetrachloride onto said magnesium to cause a reaction therebetween so as to form a titanium metal product and a magnesium chloride byproduct, continuing such reaction until there is deposited in said vessel means a substantial volume of titanium metal, and recovering said titanium metal product and said magnesium chloride byproduct, the improvement which comprises providing a pressure-regulatable, air tight interspace, between the vessel means and the furnace means, and keeping an inert gas in said interspace at a pressure close to that inside the vessel means while the vessel means is heated in the furnace means.

2. A method as recited in claim 1, in which said pressure in the interspace is within 0.2 Kg/cm$^2$ from that inside the vessel space.

3. A method as recited in claim 1, in which said pressure in the interspace is lower than that inside the vessel space.

4. A method as recited in claim 1, in which said pressure in the interspace is higher than that in the vessel space.

5. A method as recited in claim 1, in which said pressure in the interspace is substantially identical to that inside the vessel space.

6. A method as recited in claim 1, in which said inert gas substantially consists of argon.

* * * * *